Oct. 8, 1946.  O. JACOBSEN  2,409,125
SHAFT SEAL
Filed June 24, 1944
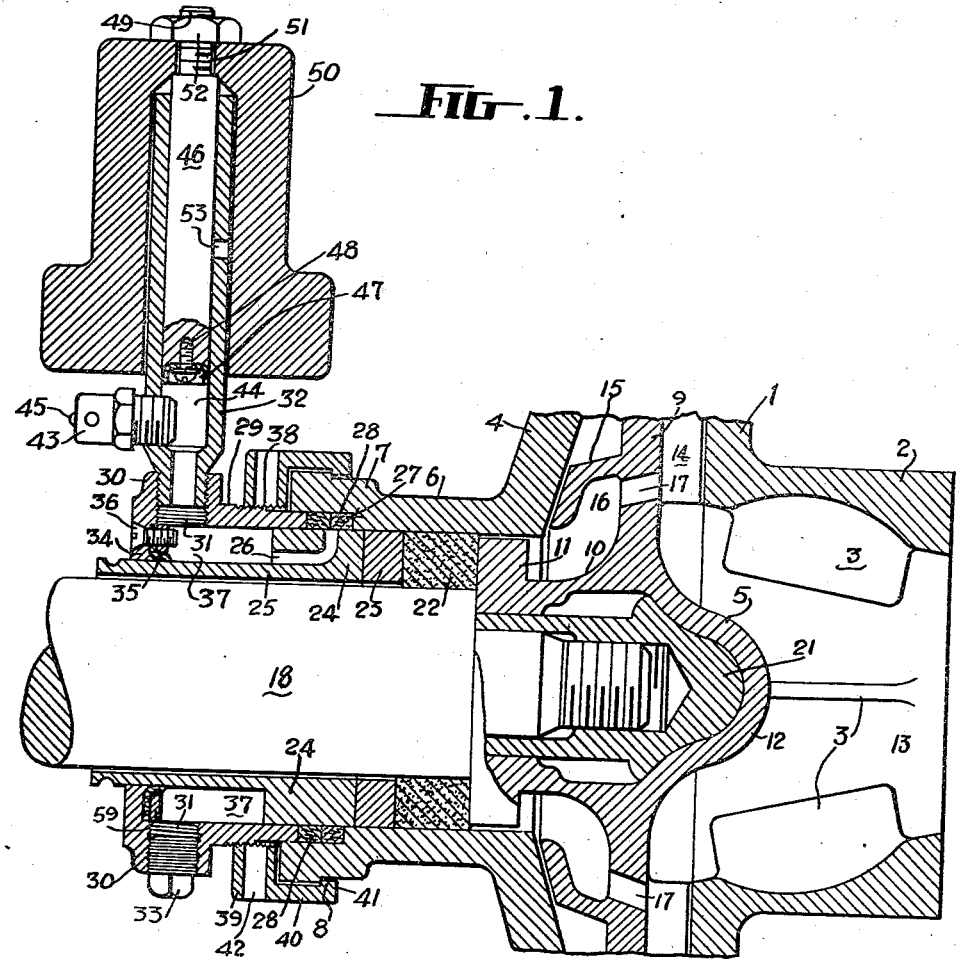
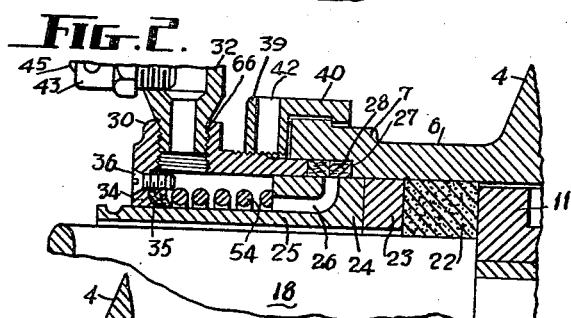
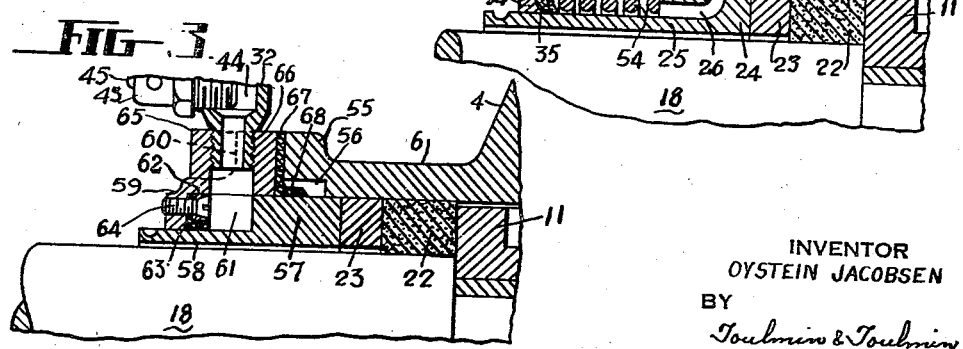
INVENTOR
OYSTEIN JACOBSEN
BY
Toulmin & Toulmin
ATTORNEYS Patented Oct. 8, 1946

2,409,125

UNITED STATES PATENT OFFICE 2,409,125

SHAFT SEAL

Oystein Jacobsen, Montgomery County, Ohio, assignor to The Duriron Company, Inc., Dayton, Ohio, a corporation of New York Application June 24, 1944, Serial No. 541,860

3 Claims. (Cl. 286—9)

The present invention relates to centrifugal pumps and more particularly to seals of those pumps which are designed to operate at considerable velocities and adapted to handle corrosive fluids.

When employing the pump for conveying an acid-containing solution, all parts of the pump which come into contact with the corrosive liquid are usually fabricated of non-attackable metal such as silicon iron. Metal of this character is so hard that it is practically unmachineable. The remaining parts of the pump and associated structure are usually made of machineable metal such as wrought iron or steel, which is susceptible to attack by acid so that considerable precaution must be exercised to prevent the acid from reaching these parts.

It has been proposed heretofore to employ for an effective seal an acid-resistant anti-friction member such as graphite which is pressed against a rotating part of the shaft at a suitable position in order to prevent longitudinal and radial creepage of the acid which might otherwise reach the bearings in which the shaft is journaled. For this purpose either the shaft is provided with a shoulder against which the member bears or else the latter is caused to contact with a ring-like projection formed on the impeller. In either case pressure is usually exercised longitudinally of the shaft against the member so as to prevent any radial leakage at the thrust bearing surface. In certain types of shaft seals this member takes the form of a ring and is contained between the shaft and a cylindrical portion of the casing, filling the annular space so tightly as to prevent or at least substantially reduce any longitudinal leakage of the fluid. Any fluid which should happen to leak past the bearing is usually absorbed by packing material so that eventually none of the fluid is permitted to creep along the shaft for any appreciable distance and the bearings of the shaft which are usually positioned remote from the impeller are maintained entirely free of the corrosive fluid.

Various forms of structures and devices have been proposed to apply pressure to the graphite seal and among these proposals is the use of springs which are anchored at one end in a collar fixed to the shaft and at the other end bear against the sealing member. While these pressure producing devices have given satisfactory operation, it is apparent that uniformity in the compression effects cannot always be attained as between springs so that the sealing ring might be pressed against the rotating part with a greater force at one point than at another causing unevenness of wear. Moreover, one or more of the springs which are usually equidistantly spaced about the shaft may break due to flaw in the material or crystallization and again the pressure exercised against the seal member is not uniform throughout the entire bearing surface.

The primary object of the invention is to provide an improved form of shaft seal, particularly useful in connection with centrifugal pumps handling corrosive fluids and in which a constant pressure is uniformly exercised against the parts of the seal in order to prevent leakage of the fluid, both radially and longitudinally of the shaft.

Another object is to provide an improved shaft seal utilizing a graphite or similar sealing member and in which pressure is applied against the member without the use of springs or similar devices which tend to have impaired thrust effects and are also apt to break from time to time.

A still further object is to provide an improved shaft seal in which longitudinal pressure is exercised against the seal parts uniformly over the entire surface of one of the seal parts and to provide in this connection structure by which it can be readily determined as to whether pressure is actually being applied to the seal and also the amount of the pressure.

In carrying out the above objects I use the principle of hydrostatic pressure obtained by means of a weighted element acting hydrostatically through a fluid which may conveniently comprise the lubricant acting directly against one of the seal parts. The arrangement is such that the position of the weighted element tells at a glance as to whether or not pressure is actually being produced at the seal and the intensity of that pressure. While I prefer to eliminate all use of springs and similar devices for producing pressure, nevertheless the structure of my invention can be sometimes advantageously used in combination with such springs and devices.

The invention will be better understood when reference is made to the following description and the accompanying drawing in which:

Figure 1 represents a longitudinal section of the improved seal together with the constant pressure producing structure and applied to a typical form of centrifugal pump. The various shafts in this figure have been shown in elevation for clearness.

Figure 2 is a fragmentary sectional view of a modified form of structure, while Figure 3 shows still another modification.

Referring to Figure 1, reference character 1 designates the front half casing of the pump and is provided with a cylindrical projection 2 constituting the inlet and having swirl straightening members 3 extending along the inner bore. The rear portion of the casing is designated 4 and is clamped or in any other manner secured to the casing portion 1. The outlet (not shown) of the pump is formed at the peripheral edge of the casing portion 4 and an impeller 5 is contained within the casing 4 for drawing fluid through the inlet 2 and expelling the same under pressure through the outlet. The casing portion 4 is extended longitudinally to the rear to form a cylinder 6 which terminates in an enlarged outwardly extending flange portion 7, the latter being provided with a shoulder indicated at 8, the purpose of which will be explained hereinafter.

The impeller may comprise a radially extending web 9 which merges at the center into a hollow hub 10 which terminates at the shaft in a thrust collar 11. This collar has a diametral size slightly less than the bore of the cylindrical member 6 so as to eliminate friction when the impeller is rotated. The web 9 is also provided with a conically shaped thin walled portion 12 which extends into the inlet opening 13. Blades 14 taking the shape of an involute are equidistantly spaced about the web. The height of the blades is slightly less than the distance between the web 9 and the inner surface of the casing portion 1 so that the blades will not contact the casing. The casing portion 4 (the rear part of the casing) is given an incline or conical configuration and there is a flange portion 15 integrally secured to the rear face of the web 9, this portion also extending inwardly, following the same direction as the rear wall 4 of the casing but out of contact therewith. There are a number of vanes 16 extending between the inner surface of the flange portion 15 and the hub portion 10. The function of these blades will be explained hereinafter.

There are a series of holes 17 extending through the web portion 9 and positioned between the flange portion 15 and the hub portion 10. The impeller 5 is mounted on and carried by a shaft 18 which is provided at one end with a pair of shouldered portions, one of which is threaded. There is provided within the cavity of the impeller a liner 21 usually of a readily fusible metal end cast in place as is well-known in the art. This liner is bored out to receive the end portions of the shaft and is threaded to engage the threads of the shaft.

The latter is journaled within a pair of bearings (not shown) usually of the ball bearing type so that the impeller overhangs the bearings. A motor or other prime mover may be employed to rotate the shaft at a high speed.

When the impeller is rotated a suction is created in the inlet 13 by which to draw fluid through the inlet from any source and this fluid passes radially outward through the spaces of the blades 14 and is discharged at the outlet (not shown) in the form of a high velocity stream.

As the impeller rotates, a certain amount of the fluid drops to the rear of the impeller due to leakage and some of this fluid flows past the flange portion 15 and would normally travel along the interior of the cylinder 6 and eventually reach the bearings of the shaft 18. However, the blades 16 which move with the impeller create a pressure at the rear portion thereof to force the leakage fluid through the openings 17 to the front side of the impeller where it passes out between the blades 14 as useful pressure fluid. The blades 16 account for a great deal of the leakage fluid, but even so, there are small but very important amounts that still tend to creep along the shaft 18. The present invention is concerned more especially with this creepage fluid.

A sealing ring 22 made of graphite or other self-lubricating material or plastic material or a suitable metal surrounds the shaft 18 and is contained within the cylindrical extension 6 at a position such as to abut the outer surface of the thrust collar 11. The ring snugly fits over the shaft 18 but is not secured thereto. A heavy washer 23 or ring of metal, preferably silicon iron, contacts with the ring 22 and as shown, the internal diameter of the ring 23 is slightly larger than the shaft. The outer size of the ring 23 is such that it fits snugly but slidably within the cylinder 6. A pressure block or piston 24 of machineable metal is employed to apply pressure to the ring 23 and in turn to the sealing ring 22.

This pressure block has a long extending sleeve portion 25 over relatively small diameter and the size of the bore within the sleeve is such as to leave a little clearance about the shaft 18 so that the block 24 can readily move with respect to the shaft. There is an angular opening 26 extending from the left hand surface of the block and coming out of the block at its periphery; the purpose of this opening will be explained hereinafter. The flange portion 7 of the cylinder 6 is provided with a cut-back recess indicated at 27 of annular configuration and packing material 28 is placed within this recess, this material being indicated as a pair of packing rings. These rings are positioned in line with the angular opening 26 as is shown on the drawing.

A gland member 29 of a sleeve-like shape has a portion thereof adapted to fit loosely into the annular space or recess formed in the gland 7 so as to apply pressure against the packing rings. This member has a cylindrical shape and is provided at its left hand end with a pair of oppositely positioned outwardly extending bosses 30. These bosses are provided with threaded openings 31 one of which is adapted to receive the threaded end of a hollow upstanding column 32 and the other is adapted to be closed by a screw plug 33. The gland member 29 is provided with an integral closure plate 34 which has an opening therethrough for snugly receiving the sleeve 25. A cup washer ring 35 is secured to the closure plate by means of screws 36, which fasten into a metal retaining ring, the function of the cup washer being to render fluid-tight the joint between the plate 34 and the sleeve 25. It is apparent that the sleeve member 29, together with the closure member 34 provides an annular space or chamber 37 about the sleeve 25 and the purpose of this chamber will also be described. The sleeve 29 is threaded as indicated at 38 to receive a clamping ring 39 which is provided with a cylindrical sleeve-like extension 40 terminating in a lip 41 which overhangs the shoulder 8 of the cylinder 6. Thus, by tightening the clamp ring 39 a force is exerted on the gland member 29 to apply pressure toward the right against the packing rings. Two or more spanner wrench openings 42 may be provided about the clamp ring 39 for tightening purposes.

The metal column 32 is hollow and has a large flared-out portion extending vertically upward from the gland member 29 by which it is supported. The wall of the cylinder column may be provided with a threaded opening for receiving a fitting 43 preferably of the Alemite spring-pressed ball type by which lubricant can be forced into the opening or chamber 44 when a grease gun is applied to the check valve 45. Within the compartment or chamber 44 there is a piston 46 having a cup shaped washer 47 screwed thereto as indicated at 48 and this piston terminates at the top in a threaded shank 49. A heavy weight 50 of metal provided with a necked-down portion 51 is suspended on the shank or threaded portion 49 of the piston 46 and is held in position by means of a nut 52. The interior diameter of the weight 50 is quite appreciably larger than the diameter of the column 32 so as to prevent all friction. The arrangement is such that as the piston 46 is moved upwardly as will be described presently, the weight 50 is elevated to a corresponding distance.

In operation the lubricant is introduced into the compartment 44 at the fitting 43 and this lubricant will fill the entire interior of the cylinder 32 below the piston and also the annular space 37 including the annular opening 26. As lubricant is continued to be forced through the fitting 43 the piston 46 is caused to be elevated carrying with it the weight 50. In order to limit the amount of lubricant that can be forced into the compartment 44 as the piston moves upwardly an opening 53 is provided in the wall of the cylinder 32 so that as the piston moves upwardly the opening 53 is uncovered and assuming that the lower edge of the weight 50 is in line with the washer 47 of the piston, the excess lubricant will be pressed outwardly through the opening 53 and run down over the cylinder 32. Thus, the piston and the weight 50 can be elevated only to a predetermined height.

It is apparent that when the chambers 44 and 37 have been completely loaded with lubricant through the fitting 43, the weight of the member 50 and of the piston together serves to apply a constant pressure on the lubricant throughout their entire travel downwardly and thereby assure a constant and even supply of lubricant to the packing rings 27 through the opening 26. In addition, the hydrostatic pressure within the lubricant obtained in this manner exerts a constant thrust against the left hand surface of the block 24 which in turn presses against the heavy washer 23 and the latter in turn provides a thrust of constant pressure against the sealing ring 22. The latter is subjected to wear due to the rotation of the thrust collar 11 of the impeller since there is relative motion between this collar and the sealing ring and such wear is automatically taken up by the pressure exerted on the block 24.

In addition to serving as a source of constant pressure due to its invariable weight the element 50 also serves as a tell-tale for indicating at a glance the amount of lubricant contained within the chamber 44. Obviously, if desired, the column 32 can have indication marks formed thereon to show the total quantity of lubricant contained within the compartments 44 and 37 in terms of the quantity that these compartments are supposed to hold.

Thus, as the impeller 5 is rotated by the shaft 18 a constant pressure is applied between the sealing ring 22 and the thrust collar 11, thereby preventing any radial leakage between the ring and the collar, which leakage might normally permit acid-containing liquid to creep along the shaft 18. The packing rings 28 to which a pressure is applied by the gland member 38 are always in the state of being pressure lubricated. This serves additionally to prevent any leakage along the outer circumferential surface of the block 24. Consequently, all avenues of escape along the shaft of the liquid or fluid being pumped by the impeller 5 are effectively cut off by the leak-preventing members described hereinbefore and these members are maintained in a continuously effective condition by the constant pressure exerted on the lubricant contained within the compartments 44 and 37.

While the weight 50 can be made sufficiently large to apply the necessary pressure to the block 24, I may if desired, reduce the size of the weight and rely partly on spring pressure against the block.

Figure 2 shows a modification of this character. In this figure similar reference characters have been given to corresponding parts of Figure 1 so that it is unnecessary to describe these parts. It will be noted in this figure that a compression spring 54 loosely surrounds the sleeve 25 and is contained between the inner surface of the closure plate 34 or the washer 35 and the left hand surface of the block 24. This spring serves to add a thrust effect toward the right on the block 24 and in that manner reduces the necessity for having a large weight 50 for the same purpose. While I have described this modification in terms of relying partly on the weight 50 (Figure 1) and the thrust effects of the spring 54 continuously to press the block 24 against the rings 23 and 22, I may if desired, eliminate the weight 50 and rely solely on the spring 54. However, in practice it is found that springs are subject to fracture and over a considerable period of time tend to lose some of their pressure exerting effects so that in general, I prefer to employ a weight 50 of reduced size in combination with a spring in order to be assured that there will at least be some pressure continually exerted against the block 24, even if the spring were to break. In view of the fact that the spring is always contained in a bath of lubricant the life of this element tends to be greater than if it were exposed directly to the atmosphere.

Figure 3 shows still another modification of my invention. The cylinder 6 of the pump casing terminates in a flange 55 which may have a countersunk annular recess 56. Immediately adjacent the thrust ring 11 of the impeller there is provided a sealing ring 22 as in Figure 1 and a heavy washer 23 of metal may be positioned next to the sealing ring. A pressure block 57 somewhat similar to that shown and described in Figure 1, is also employed but the block does not contain any lubricant opening. The block 57 is provided with an extending sleeve 58 as in the case of that described in connection with Figure 1. There is a ring 59 secured in any suitable manner to the flange 55 of the cylinder 6, this ring being shouldered as indicated at 60 and being provided with a deep annular recess 61 opening into the right hand surface of the ring and extending at 62 well toward the left hand surface of the ring in order to receive a packing member 63 which is screwed in place as indicated at 64. There is a pair of oppositely disposed bosses 65 extending upwardly and outwardly from the shouldered surface 60 of the ring. One of these bosses is provided with a threaded bore which communicates with the annular recess 61 formed in the ring. This bore is adapted to receive the threaded end of the metal column 32 which was described in connection with Figure 1.

The opposite boss is also provided with a threaded opening similar to the opening 30 in Figure 1 for receiving a screw plug 33. It is apparent that the function of the screw plug is to permit a flushing out of the system when desired. There is a washer 67 interposed between the right hand surface of the ring 59 and the left hand surface of the flange 55. This washer is provided with a ring-like portion 68 which is accommodated within the recess 56. The ring 59 is secured to the flange 55 by any suitable clamping arrangement as is well known in the art. Thus, as the ring 59 is forced against the flange 55, the washer 67 is compressed and the extension 68 is forced inwardly against the block 57 to prevent any leakage at these various joints.

As in the case of Figure 1, the continuous pressure exerted on the lubricant in the annular recess 61 by the weight 50 and the piston 47 serves to apply a thrust against the left hand surface of the block 57 which in turn presses against the heavy washer 23 and the sealing ring 22. The latter is therefore forced against the thrust collar 11 preventing any leakage in the radial direction at this point. It is apparent that if desired, a spring 54 as was explained in connection with Figure 2 may be inserted in the annular recess 61 for supplementing the pressure producing effects of the weight 50.

Having thus explained my invention, what I claim as new and desire to secure by Letters Patent, is:

1. A seal for a fluid pressure pump having a casing, a pump shaft and an impeller connected thereto, said impeller being provided with a thrust collar, said seal comprising a sealing ring mounted about the shaft and in abutting relation to the thrust collar, and means for applying a continuous pressure to said sealing ring, said means including a pressure block mounted on said shaft and having a reduced sleeve portion, a gland surrounding said sleeve and providing with said sleeve a pressure chamber for receiving hydraulic fluid, whereby sealing pressure is applied to said sealing ring.

2. A seal for a fluid pressure pump having a casing, a pump shaft and an impeller connected thereto, said impeller being provided with a thrust collar, said seal comprising a sealing ring mounted about the shaft and in abutting relation to the thrust collar, and means for applying a continuous pressure to said sealing ring, said means including a pressure block mounted on said shaft and having a reduced sleeve portion, a gland surrounding said sleeve and providing with said sleeve a pressure chamber for receiving hydraulic fluid, whereby sealing pressure is applied to said sealing ring, said gland having a packing, and a passageway in said pressure block for lubricating said packing.

3. A seal for a fluid pressure pump having a casing, a pump shaft and an impeller connected thereto, said impeller being provided with a thrust collar, said seal comprising a sealing ring mounted about the shaft and in abutting relation to the thrust collar, and means for applying a continuous pressure to said sealing ring, said means including a pressure block mounted on said shaft and having a reduced sleeve portion, a gland surrounding said sleeve and providing with said sleeve a pressure chamber for receiving hydraulic fluid, whereby sealing pressure is applied to said sealing ring, said gland having a plate, said plate closely surrounding said reduced sleeve and forming a seal with said reduced sleeve.

OYSTEIN JACOBSEN.